Patented Oct. 17, 1922.

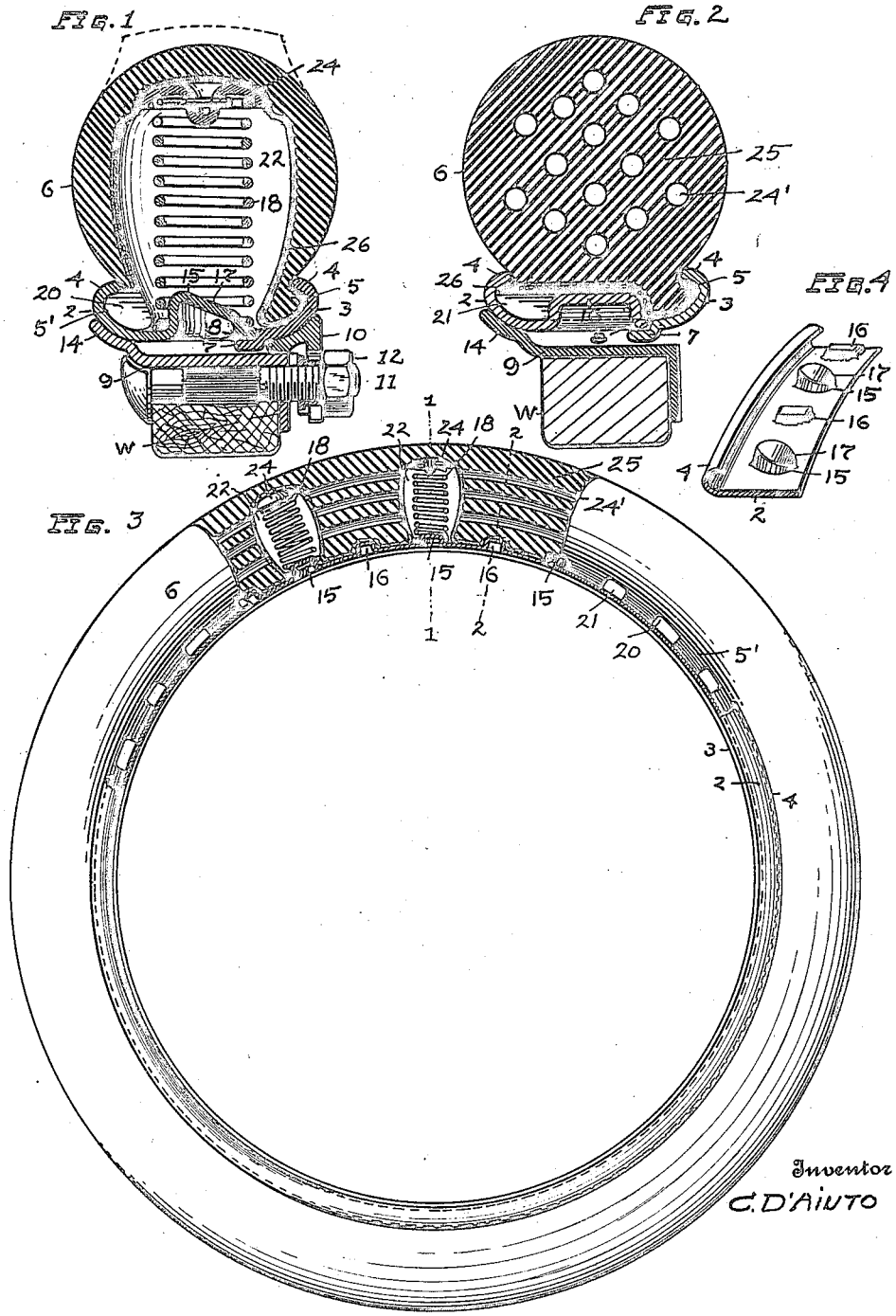

1,432,158

UNITED STATES PATENT OFFICE.

CARL D'AIUTO, OF CLEVELAND, OHIO.

RESILIENT VEHICLE TIRE.

Application filed April 24, 1922. Serial No. 556,263.

*To all whom it may concern:*

Be it known that I, CARL D'AIUTO, a citizen of the United States, residing at Cleveland, in the county of Cuyahoga and State of Ohio, have invented certain new and useful Improvements in a Resilient Vehicle Tire, of which the following is a specification.

This invention relates to vehicle tires and rims and my object is to combine a rubber cushion tire and a series of helical springs in a particular way to promote resiliency and to seat the tire and springs together upon a sectional rim so as to permit the tire and springs to be readily removed and replaced and to be firmly fixed in working position when assembled together.

In the annexed drawing, Fig. 1 is a cross section of my improved tire and rim on line 1—1 of Fig. 3, but showing in addition a part of a vehicle felly and a fastening bolt and clamp. Fig. 2 is a cross section of the tire and rim on line 2—2 of Fig. 3. Fig. 3 is a side view of the tire mounted on a rim, portions being in section. Fig. 4 is a perspective view of a portion of the inner rim section.

The invention comprises a sectional rim made in two endless parts 2 and 3, respectively, each having a curved inturned border flange 4 adapted to confine the bead portions 5 of a rubber tire 6. The rim section 3 has an offset 7 at its inner edge adapted to seat the overlapping edge portion 8 of section 2, and these sections are adapted to be clamped tightly together when seated upon the metal band 9 of a wheel felly W as shown in Fig. 1, where a separate clamping member 10 is shown as engaging rim section 3 and a bolt 11 and nut 12 serve to hold the parts together in place upon band 9, which has a raise curved seat 14 at the inner or vehicle body side of the wheel to support rim section 2 at that side and to space it apart from the outer flat portion of the band so as to receive offset 7 of rim section 3 beneath edge 8.

The outer flat face of rim section 2 is provided at uniformly spaced intervals with round beveled projections 15 and straight lugs 16 alternately arranged around the circumference of the rim section opposite or adjacent edge 8. Projections 15 have their beveled outer faces 17 sloping inwardly toward edge 8 to facilitate seating of helical springs 18 over and around such projections when a rubber cushion tire 6 containing such springs is slipped upon rim section 2, and to make the mounting of the tire on section 2 easy and less difficult the inner bead 5' of the tire is slotted transversely at 20 opposite each projection 15. Similar slots or channels 21 are provided in the base of the tire opposite the driving lugs 16 on rim section 2, see Fig. 2, and these lugs provide interlocking and driving connection for the tire intermediate the adjacent projections 15, which merely serve to center and hold the springs 18 axially in line with the round pockets 22 which are open to the base of the tire and extend radially toward the tread where said pockets are closed and seat a metal disk or plate 24 affixed to the outer end of each spring 18. The radial pockets 22 are in open air communication with each other, a series of small round openings 24' extending through the otherwise solid wall 25 between the pockets to make these portions of the tire resilient and to provide for a free flow of air between the pockets when the tire is compressed in running over the road. The base of the rubber tire and the inner walls of the pockets may be lined and re-enforced with tire fabric or cords 26 as shown in Figs. 1 and 2.

What I claim, is:

1. A rubber and spring vehicle tire having radially related pockets open to its base and a series of openings extending circumferentially within the tire between said pockets, helical springs removably confined within said pockets, and a rim adapted to seat said tire.

2. A rubber and spring vehicle tire having a series of uniformly spaced radially related pockets open to its base portion and provided with transverse base channels, helical springs within said pockets, and a rim having projecting portions opposite said channels adapted to seat said springs.

3. A rubber and spring vehicle tire having pockets and transverse channels alternately at uniformly spaced intervals in its seating base portion, helical springs removably confined within said pockets, and a rim adapted to seat said tire having driving projections adapted to occupy said channels.

4. A rubber and spring vehicle tire having pockets radially therein open to the seating base thereof, helical springs within said pockets, and a rim having beveled projections adapted to engage the base ends of said springs.

5. A rubber and spring vehicle tire having pockets extending radially into the body of the tire from its base and channels extending transversely of its base into one side of the tire, helical springs within said pockets, and a rim adapted to seat said tire having projections adapted to pass through said channels.

6. A rubber and spring vehicle tire having radially arranged pockets open to its base and transverse channels intermediate said pockets, helical springs within said pockets, and a sectional rim adapted to seat said tire having driving lugs adapted to occupy said channels.

In testimony whereof I affix my signature in the presence of a witness.

CARL D'AIUTO.

Witness:
GEO. E. KRICKER.